US010938701B2

United States Patent
Kumar et al.

(10) Patent No.: US 10,938,701 B2
(45) Date of Patent: Mar. 2, 2021

(54) EFFICIENT HEARTBEAT WITH REMOTE SERVERS BY NAS CLUSTER NODES

(71) Applicant: EMC IP Holding Company LLC, Hopkinton, MA (US)

(72) Inventors: Shiv Shankar Kumar, Pune (IN); Jai Prakash Gahlot, Pune (IN); Amit Kumar Chauhan, Pune (IN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 168 days.

(21) Appl. No.: 16/039,957

(22) Filed: Jul. 19, 2018

(65) Prior Publication Data

US 2020/0028769 A1   Jan. 23, 2020

(51) Int. Cl.
*H04L 12/26* (2006.01)
*H04L 29/08* (2006.01)
*G06F 21/56* (2013.01)

(52) U.S. Cl.
CPC .............. *H04L 43/10* (2013.01); *G06F 21/56* (2013.01); *H04L 67/025* (2013.01); *H04L 67/1097* (2013.01)

(58) Field of Classification Search
CPC ... H04L 43/10; H04L 67/025; H04L 67/1097; G06F 21/56
USPC .............................................. 709/224; 726/22
See application file for complete search history.

(56) References Cited

U.S. PATENT DOCUMENTS

| | | | | |
|---|---|---|---|---|
| 8,776,235 | B2* | 7/2014 | Coronado | G06F 21/567 709/224 |
| 8,806,037 | B1* | 8/2014 | Kalra | H04L 43/0817 709/223 |
| 8,824,686 | B1* | 9/2014 | Ishii | H04L 9/08 380/243 |
| 2002/0174307 | A1* | 11/2002 | Yoshida | H04L 12/467 711/152 |
| 2004/0034671 | A1* | 2/2004 | Kodama | G06F 9/4416 |
| 2005/0125526 | A1* | 6/2005 | Chou | G06F 21/56 709/223 |
| 2006/0101263 | A1* | 5/2006 | Costea | G06F 21/564 713/164 |
| 2007/0198718 | A1* | 8/2007 | Savoor | H04L 67/1095 709/226 |
| 2008/0077987 | A1* | 3/2008 | Hanes | G06F 21/562 726/22 |

(Continued)

*Primary Examiner* — Moustafa M Meky
*Assistant Examiner* — Sahera Halim
(74) *Attorney, Agent, or Firm* — Amin, Turocy & Watson, LLP

(57) ABSTRACT

Efficient heartbeat with remote servers by network-attached storage (NAS) cluster nodes is provided herein. A data storage system as described herein can include a memory that stores computer executable components and a processor that executes computer executable components stored in the memory. The computer executable components can include a node assignment component that generates assignments for NAS nodes resulting in respective associated NAS nodes, the assignments associating respective ones of the NAS nodes with respective distinct anti-malware servers, and a heartbeat messaging component that instructs the respective associated NAS nodes to transmit heartbeat request messages to the respective distinct anti-malware servers according to the assignments.

20 Claims, 11 Drawing Sheets

(56) References Cited

U.S. PATENT DOCUMENTS

| | | | |
|---|---|---|---|
| 2008/0086774 A1* | 4/2008 | Kanda | G06F 21/562 726/24 |
| 2009/0019544 A1* | 1/2009 | Suffern | H04L 63/1441 726/22 |
| 2009/0089862 A1* | 4/2009 | Sun | G06F 3/0622 726/4 |
| 2011/0087766 A1* | 4/2011 | Kuo | G06Q 50/10 709/224 |
| 2011/0197279 A1* | 8/2011 | Ueoka | G06F 21/56 726/24 |
| 2014/0337488 A1* | 11/2014 | Naseh | H04L 41/0803 709/220 |
| 2015/0372962 A1* | 12/2015 | Padmanabhan | H04L 51/18 709/206 |
| 2016/0286600 A1* | 9/2016 | Faccin | H04W 48/18 |
| 2017/0142130 A1* | 5/2017 | Lin | H04L 67/1097 |
| 2018/0268138 A1* | 9/2018 | Quintero Ramirez | G06F 21/561 |

\* cited by examiner

| Server ID | Server Status |
|-----------|---------------|
| 1 | 1 (Active) |
| 2 | 0 (Inactive) |
| 3 | 1 (Active) |
| 4 | 1 (Active) |
| 5 | 0 (Inactive) |

EFFICIENT HEARTBEAT WITH REMOTE SERVERS BY NAS CLUSTER NODES

TECHNICAL FIELD

The subject application is related to data storage, and more particularly, to techniques for managing data security in a data storage system.

BACKGROUND

As computing technology has advanced over time, so too has the amount and scope of data that can be maintained and analyzed via computer systems. For instance, the ability to manage very large data sets, commonly known as big data, has led to significant advances in fields such as manufacturing, media, science, and e-commerce, among many others. Data storage systems, such as those utilized in network-attached storage (NAS) platforms, provide the means by which these large sets of data can be maintained in an efficient and reliable way. In addition to providing a means for storing data, an NAS platform can implement one or more data security and/or protection techniques to ensure the integrity of data stored on the platform. For instance, an NAS platform can perform and/or manage scanning of respective files stored on the platform for viruses or other forms of malware according to one or more scanning policies.

SUMMARY

The following summary is a general overview of various embodiments disclosed herein and is not intended to be exhaustive or limiting upon the disclosed embodiments. Embodiments are better understood upon consideration of the detailed description below in conjunction with the accompanying drawings and claims.

In an aspect, a data storage system is described herein. The data storage system includes a memory that stores computer executable components and a processor that executes computer executable components stored in the memory. The computer executable components can include a node assignment component that generates assignments for NAS nodes resulting in respective associated NAS nodes, the assignments associating respective ones of the NAS nodes with respective distinct anti-malware servers. The computer executable components can additionally include a heartbeat messaging component that instructs the respective associated NAS nodes to transmit heartbeat request messages to the respective distinct anti-malware servers according to the assignments In another aspect, a method is described herein. The method can include generating, by a device operatively coupled to a processor, assignments for NAS nodes resulting in respective associated NAS nodes, the assignments associating respective ones of the NAS nodes with respective anti-malware servers. The method can further include instructing, by the device, the respective associated NAS nodes to transmit heartbeat request messages to the anti-malware servers according to the assignments.

In an additional aspect, a machine-readable storage medium is described herein. The machine-readable storage medium can include computer executable instructions that, when executed by a processor, facilitate performance of operations. The operations can include generating respective assignments for NAS nodes resulting in respective associated NAS nodes, where the respective assignments associate each NAS node of the respective associated NAS nodes with a distinct anti-malware server of a group of anti-malware services, and instructing each NAS node of the respective associated NAS nodes to transmit a respective heartbeat request message to the anti-malware servers according to the respective assignments.

DESCRIPTION OF DRAWINGS

Various non-limiting embodiments of the subject disclosure are described with reference to the following figures, wherein like reference numerals refer to like parts throughout unless otherwise specified.

DETAILED DESCRIPTION

Figure 1:
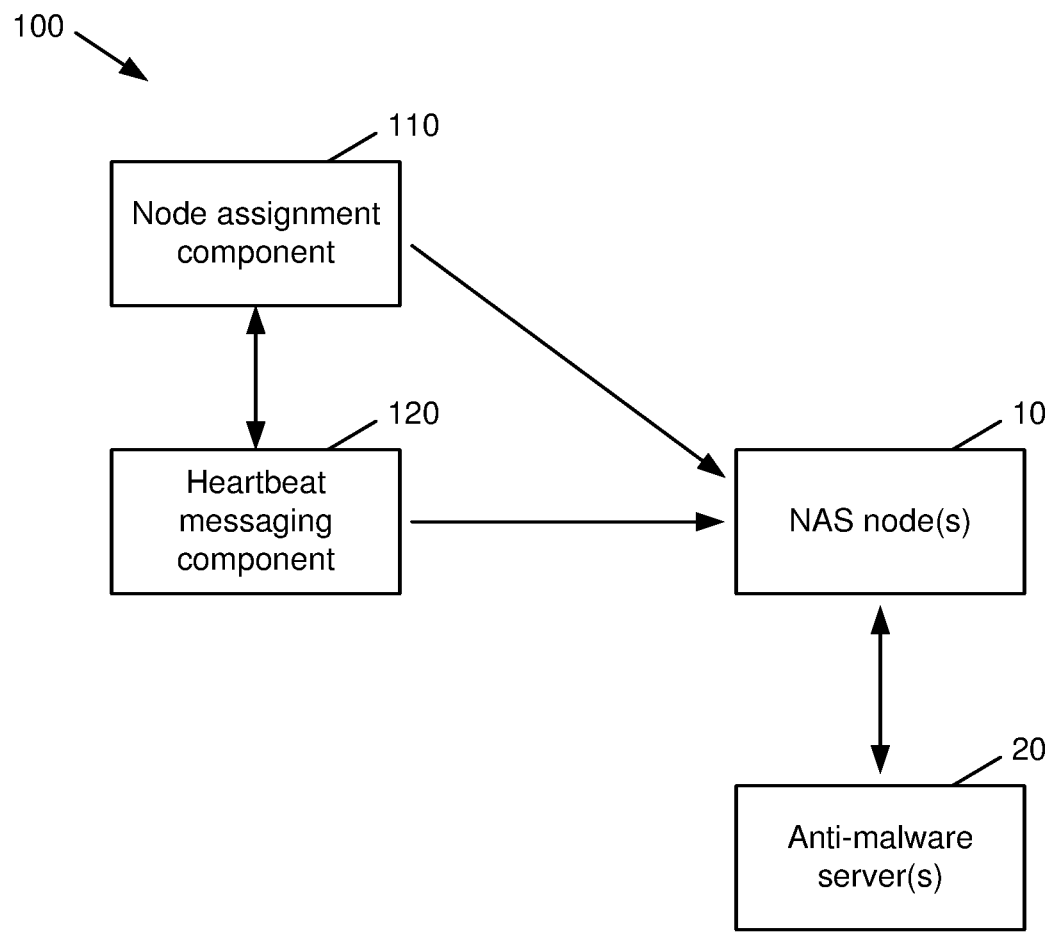
FIG. 1 is a block diagram of a system that facilitates efficient heartbeat with remote servers by NAS cluster nodes in accordance with various aspects described herein.

Various specific details of the disclosed embodiments are provided in the description below. One skilled in the art will recognize, however, that the techniques described herein can in some cases be practiced without one or more of the specific details, or with other methods, components, materials, etc. In other instances, well-known structures, materials, or operations are not shown or described in detail to avoid obscuring certain aspects.

In an aspect, a network-attached storage (NAS) platform can serve as a storage environment for various types of data, which can provide a functionally unlimited amount of storage space for multiple users via a seamless single volume and a single file system. Additionally, a NAS platform and/or system can leverage one or more external servers running third-party software (e.g., antivirus software, audit software, etc.). For instance, an NAS system can utilize antivirus servers (AVSs) or other anti-malware servers to prevent malware-infected files from entering or residing in storage. For instance, files that are stored and/or accessed in an NAS system can be scanned (e.g., in real time and/or according to scheduled or forced scans) for viruses or other malware by an associated anti-malware server external to the respective NAS clusters.

Multiple anti-malware servers can be deployed to properly serve the demand from a high-capacity NAS system. For instance, when a client accesses a file stored on an NAS system, the file can be first scanned by one of many anti-malware servers. Also or alternatively, the files can be scanned by forced or scheduled scan tasks. However, in order for the NAS system to facilitate file scanning by the external servers in an efficient manner, it is desirable for the system to pre-identify which remote servers are active, e.g., via a periodic status check or heartbeat, in an efficient manner that reduces overhead at both the NAS system and the remote servers associated with heartbeat messages.

To the foregoing and/or related ends, various embodiments described herein provide techniques by which active and/or inactive anti-malware servers can be identified with reduced heartbeat messages. By way of specific, non-limiting example, the number of heartbeat messages exchanged by various embodiments as described herein can range from $O(1)$ to $O(k)$ depending on various factors, where k represents the number of deployed anti-malware servers deployed. Further, various embodiments described herein provide techniques by which heartbeat messaging with a given external server can be avoided entirely in certain cases based on recently received communications from that server. As a result of the techniques described herein, the number of heartbeat messages exchanged by an NAS system can be reduced without reducing the accuracy at which active remote servers are identified.

Various embodiments described herein can provide one or more benefits that improve the functionality of an NAS system and/or an associated AVS. A non-exhaustive list of such benefits is as follows. The amount of data exchanged between NAS cluster nodes and a remote AVS, e.g., in connection with heartbeat messages or the like, can be reduced, thereby reducing utilized network bandwidth and/or other communication resources. Computing cycles utilized by NAS nodes for heartbeat messaging can be reduced. Power consumption by NAS nodes in association with heartbeat messaging can be reduced. AVS loading associated with heartbeat messaging can be reduced, thereby increasing the availability of respective AVSs to an NAS system. Other benefits that result in improvements to the operation of an NAS system and/or an associated AVS are also possible.

With reference now to the drawings, FIG. 1 illustrates a system 100 that facilitates efficient heartbeat with remote servers by NAS cluster nodes in accordance with various aspects described herein. In an aspect, system 100 can be, or can be implemented as part of, an NAS platform and/or other computing platforms on which data sets of varying scope and/or size are desirably stored.

In an aspect, system 100 can be, or can be implemented as part of, a network-attached storage (NAS) platform and/or other computing platforms on which data sets of varying scope and/or size are desirably stored. As shown in FIG. 1, the system 100 can include computer executable components, namely a node assignment component 110 and a heartbeat messaging component 120, which can interact with one or more NAS nodes 10. The NAS nodes 10 can, in turn, communicate with one or more anti-malware servers 20 as described below. Operation of the components 110, 120 is described in further detail below. In an aspect, the components 110, 120, as well as respective components illustrated and described below with respect to the drawings that follow, can be implemented in hardware, software, and/or a combination of hardware and software. For instance, a memory (not shown) can store the components 110, 120, and a processor (not shown) can execute the components 110, 120 as stored by the memory. In such an implementation, the memory and/or processor utilized to execute the components 110, 120 can be associated with a single computing device and/or multiple computing devices (e.g., respective computing devices connected via a wired or wireless communication network). For instance, the components 110, 120, and/or other components as illustrated and described herein, can be implemented by one or more of the NAS nodes 10, one or more of the anti-malware servers 20, and/or an NAS controller device or another suitable computing device that is distinct from the NAS nodes 10 and the anti-malware servers 20. Other implementations are also possible.

In an aspect, the node assignment component 110 can generate assignments for respective NAS nodes 10 that are in communication with the node assignment component 110. These assignments can associate respective ones of the NAS nodes 10 with respective distinct anti-malware servers 20. For instance, assignments can be generated by the node assignment component 110 based on a one-to-one mapping from the NAS nodes 10 to the anti-malware servers 20, a one-to-many mapping from the NAS nodes 10 to the anti-malware servers 20, and/or in any other appropriate manner Respective examples of assignment schemes that can be utilized by the node assignment component 110 are described in further detail below with respect to FIGS. 7-9. In an aspect, assignments generated by the node assignment component 110 can map a given anti-malware server 20 to no more than one NAS node, thereby reducing the number of heartbeat messages sent by the NAS nodes from order $O(n^2)$, e.g., as associated with a many-to-many mapping between the NAS nodes 10 and the anti-malware servers 20, to between order $O(1)$ and $O(n)$ based on various factors as described herein, where n is the number of anti-malware servers 20 in system 100.

In another aspect, the heartbeat messaging component 120 can instruct the respective NAS nodes 10 for which assignments were generated by the node assignment component 110 to transmit heartbeat request messages to their respectively assigned anti-malware servers 20 according to the generated assignments. In some cases, the heartbeat messaging component 120 can instruct respective NAS nodes 10 to transmit heartbeat request messages conditionally, e.g., based on communications received from the respective anti-malware servers 20, as described in further detail below with respect to FIGS. 5-6.

Figure 2:
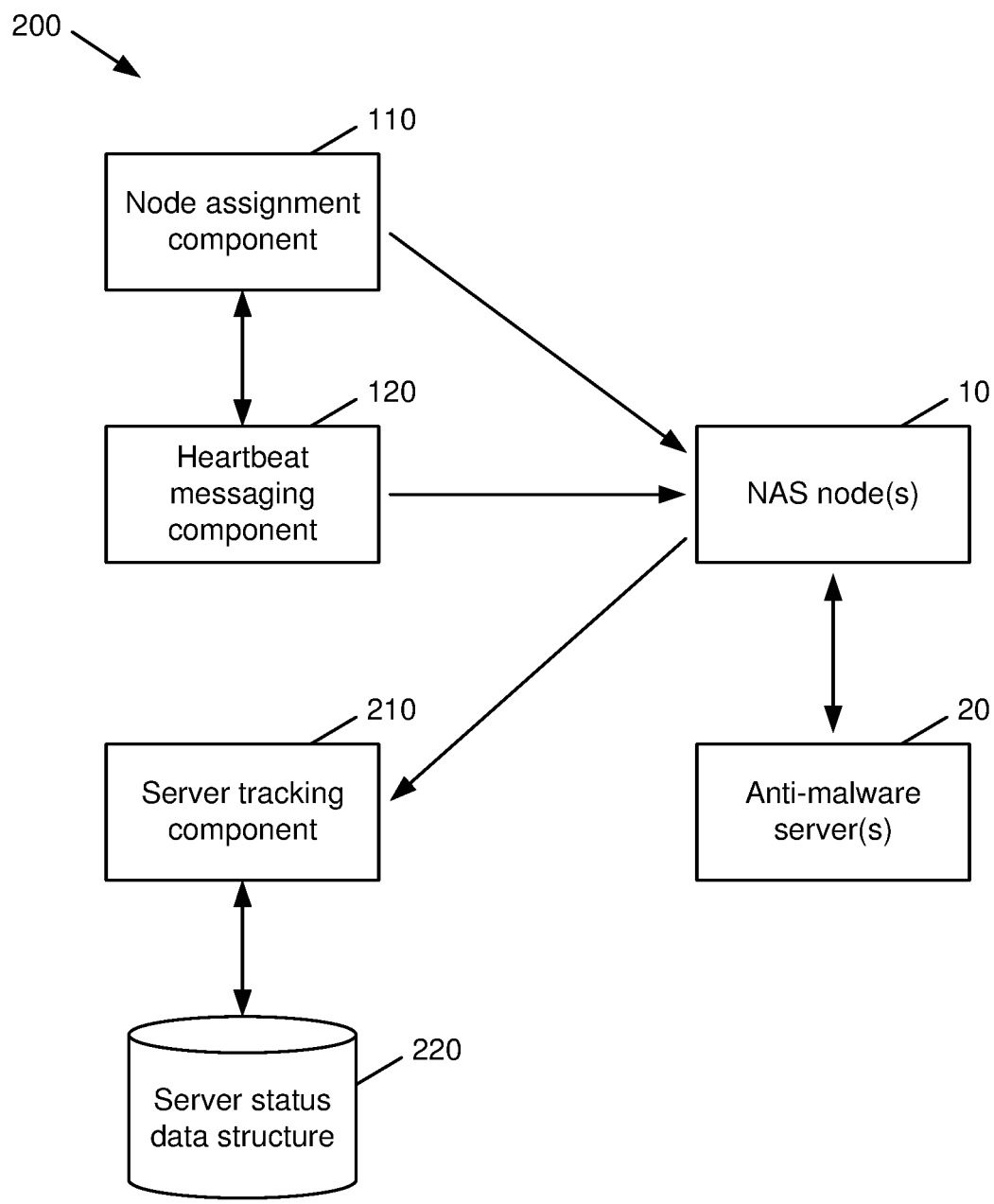
FIG. 2 is a block diagram of a system that facilitates generation and maintenance of server status data in accordance with various aspects described herein.

Turning next to FIG. 2, a block diagram of a system 200 that facilitates generation and maintenance of server status data in accordance with various aspects described herein is illustrated. Repetitive descriptions of like parts described in previous embodiments herein is omitted for the sake of brevity. As shown in FIG. 2, system 200 includes a server tracking component 210 that can maintain a data structure 220 which includes information relating to the active status of respective anti-malware servers 20 based on responses to the heartbeat request messages sent to the anti-malware servers 20 by the NAS nodes 10, e.g., according to assignments as described above with respect to FIG. 1. In an aspect, the server status data structure 220 can be implemented as a table, a database, a tree structure, a linked list, and/or any other format suitable for storing information relating to the active status of respective anti-malware servers 20.

Figure 3:
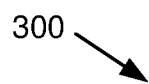
FIG. 3 is a diagram depicting an example data structure that can be utilized to store server availability data in accordance with various aspects described herein.

By way of specific, non-limiting example, the server tracking component 210 can define the server status data structure 220 as a table, referred to herein as a remote server status table (RSST), that maintains the availability status of each anti-malware server 20 associated with system 200. An example format that can be utilized for the RSST is shown by diagram 300 in FIG. 3. As shown in FIG. 3, respective ones of the anti-malware servers 20 can be indexed in the RSST by a server identifier (ID), which can be a unique numerical value associated with respective anti-malware servers 20 associated with system 200. A server ID can be associated with a given anti-malware server 20 by the NAS system (e.g., via the node assignment component 110 and/or other components), the anti-malware server 20 itself, and/or by any other suitable entity. As further shown in FIG. 3, each server indexed in the RSST can be associated with a server status. As shown by the example RSST in FIG. 3, a binary server status can be used that consists of a first value (e.g., 1) to indicate an active server and a second value (e.g., 0) to indicate an inactive server. Alternatively, the server status could be indicated in the RSST as an estimated percentage of available capacity and/or by other relative metrics. Other schemes for indicating server status could also be used.

While diagram 300 in FIG. 3 illustrates a set of servers indexed by respective server IDs, it should be appreciated that a primary key for the server status data structure 220 can be generated in any suitable manner, and other key types could also be used. It should further be appreciated that additional information could be stored by the server status data structure in addition to, or in place of, the information shown by FIG. 3.

In an aspect, if an NAS node 10 determines that an anti-malware server 20 is down or otherwise unavailable, that anti-malware server 20 can be marked as inactive in the server status data structure 220, e.g., in the manner illustrated by FIG. 3 and/or in any other appropriate manner. If an active anti-malware server 20 is erroneously marked inactive due to temporary network issues and/or other factors, the server 20 can be marked as active in the server status data structure 220 on subsequent successful heartbeat messages.

Figure 4:
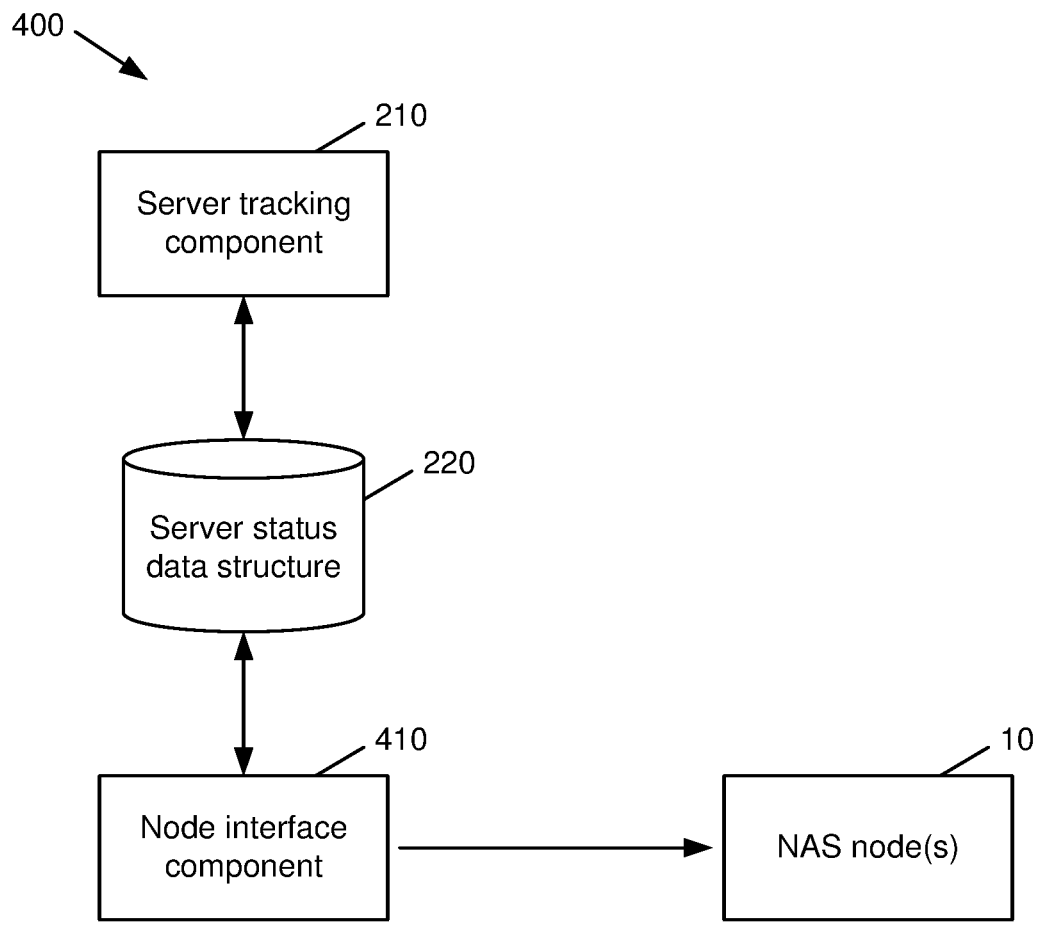
FIG. 4 is a block diagram of a system that facilitates propagation of server availability data among nodes of an NAS cluster in accordance with various aspects described herein.

With reference next to FIG. 4, a block diagram of a system 400 that facilitates propagation of server availability data among nodes of an NAS cluster in accordance with various aspects described herein is illustrated. Repetitive descriptions of like parts described in previous embodiments herein is omitted for the sake of brevity. As shown by FIG. 4, system 400 includes a node interface component 410 that can propagate information associated with the server status data structure 220, e.g., as maintained by the server tracking component 210, to respective associated NAS nodes 10. In an aspect, respective NAS nodes 10 in system 400 can store respective local copies of the server status data structure 220. The local copies of the server status data structure 220 can be updated by the corresponding NAS nodes 10 using one or more techniques as described above. In this manner, an individual NAS node 10 in system 400 can update its local server status data structures 220 based on information received from one or more anti-malware servers 20 that are in direct communication with that NAS node 10. Subsequently, the NAS node 10 can propagate updates to its local server status data structure 220 to other NAS nodes 10 in system 400 via a node interface component 410 local to the NAS node 10, thereby enabling the local server status data structures 220 at each NAS node 10 to contain synchronized information.

Also or alternatively, the server tracking component 210 can be associated with an NAS controller device and/or other computing device that is distinct from the NAS nodes 10. In such an implementation, the server tracking component 210 can collect information pertaining to respective anti-malware servers 20 from the NAS nodes 10, update a master server status data structure 220 based on the received information, and then propagate information in the master server status data structure 220 back to the respective NAS nodes 10 via the node interface component 410. Other implementations are also possible.

Figure 5:
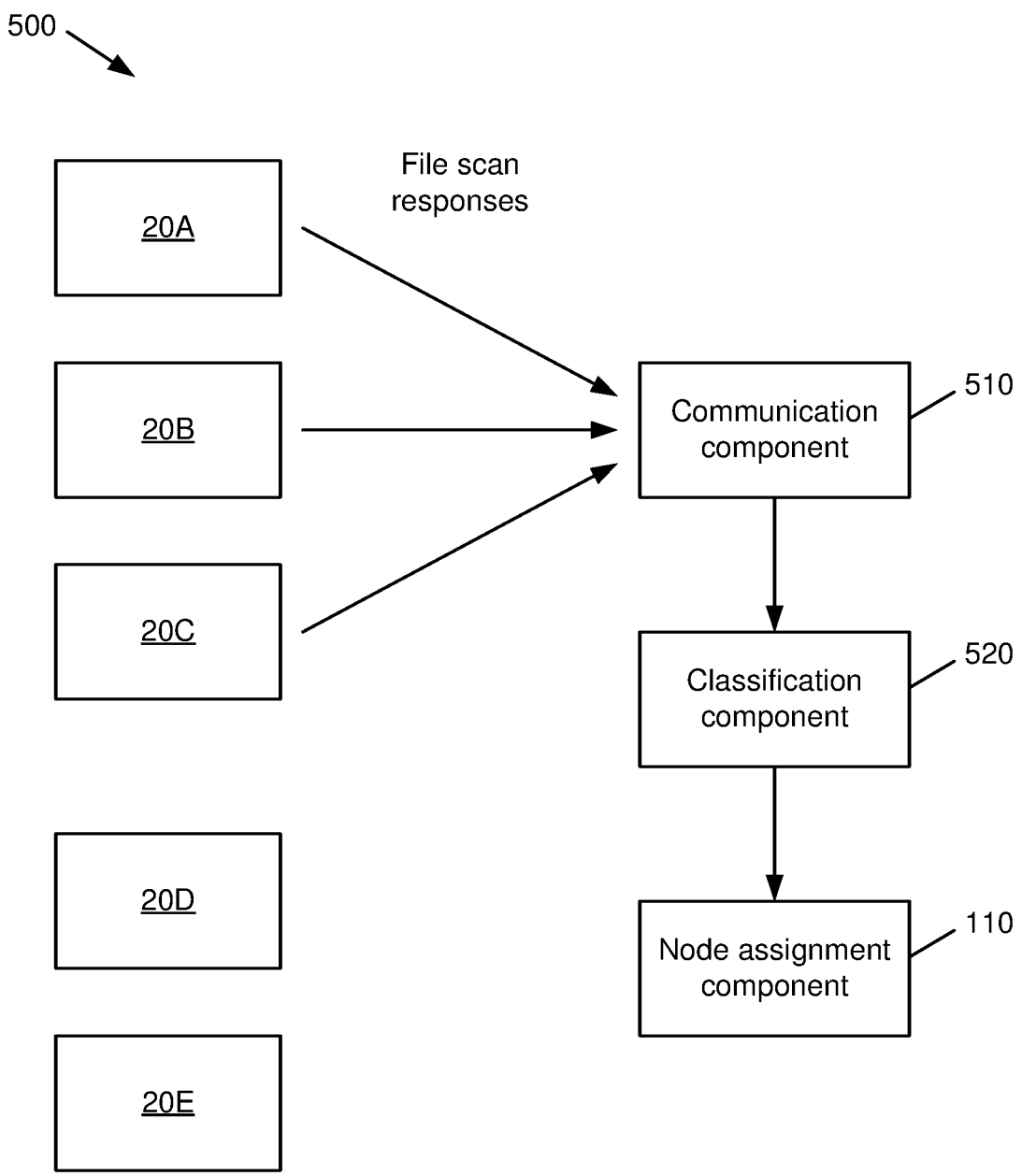
FIG. 5 is a block diagram of a system that facilitates server availability classification in accordance with various aspects described herein.

Turning to FIG. 5, a block diagram of a system 500 that facilitates server availability classification in accordance with various aspects described herein is illustrated. Repetitive descriptions of like parts described in previous embodiments herein is omitted for the sake of brevity. As shown by FIG. 5, system 500 includes a communication component 510 that can receive file scan response messages from respective first anti-malware servers 20, shown in FIG. 5 as three anti-malware servers 20A-20C for simplicity of illustration. System 500 further includes a classification component 520 that can identify respective second anti-malware servers, shown in FIG. 5 as two anti-malware servers 20D-20E for simplicity of illustration, from which file scan responses have not been received by the communication component 510 within a rolling time interval (e.g., within the last T seconds for a configurable value of T). The node assignment component 110 can then generate assignments that associate respective NAS nodes 10 with respective distinct ones of the second anti-malware servers 20D-20E without assigning any NAS nodes 10 to the first anti-malware servers 20A-20C, thereby reducing the amount of heartbeat messaging associated with system 500.

In an aspect, system 500 as described above can reduce the amount of network overhead associated with heartbeat request messages and heartbeat response messages by leveraging other communications received from active anti-malware servers 20. For instance, if the communication component 510 has received a successful communication from a given anti-malware server 20 in the last T seconds, where T denotes the size of the rolling time window for heartbeat messaging as described above, system 500 can regard that anti-malware server 20 as active without engaging in further messaging.

Figure 6:
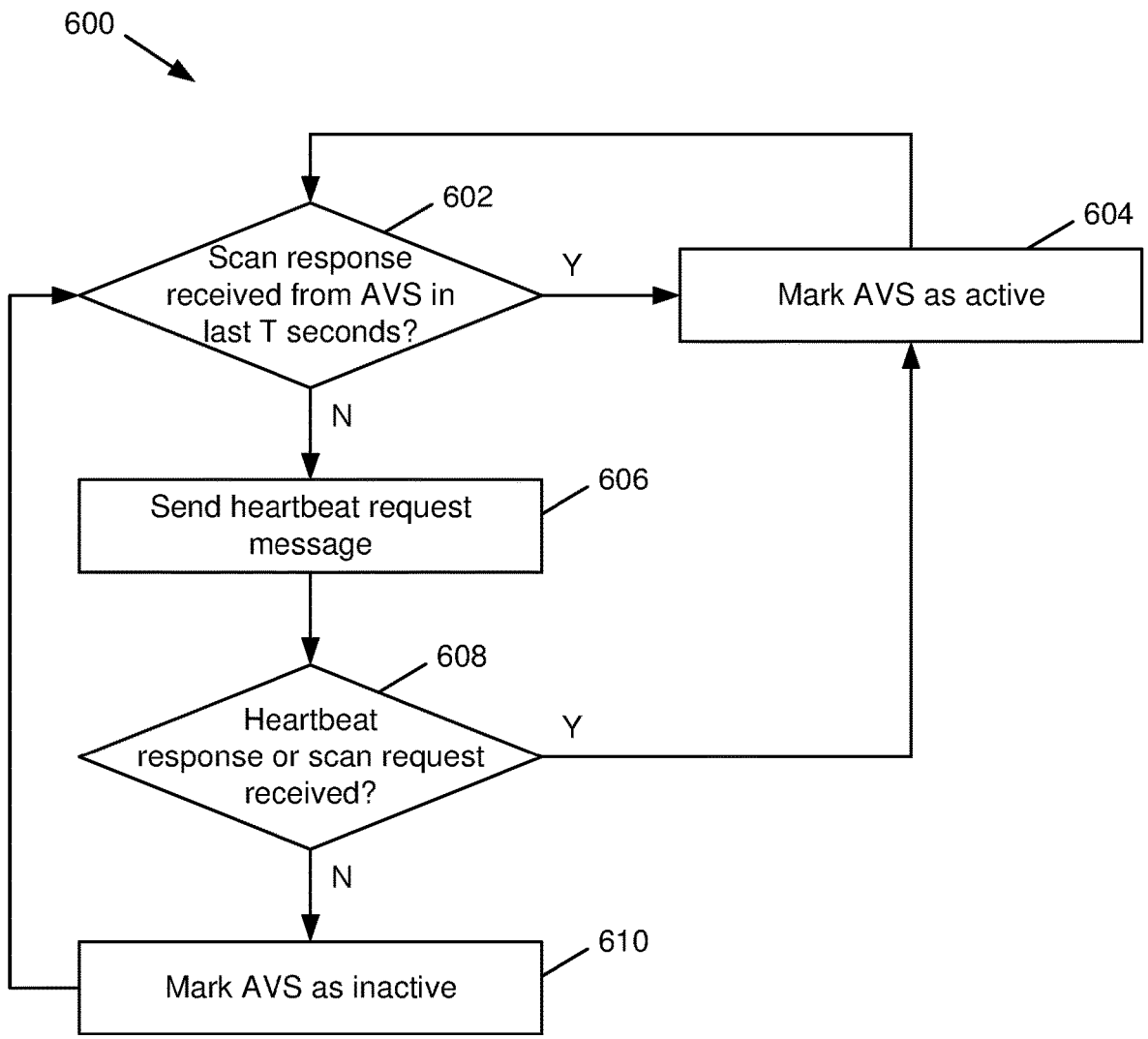
FIG. 6 is a flow diagram of a method that facilitates determining availability of respective remote servers in accordance with various aspects described herein.

With reference to FIG. 6, a flow diagram of a method 600 that can be utilized by system 500 and/or other suitable systems to determine availability of respective remote servers in accordance with various aspects described herein is illustrated. At 602, the communication component 510 and/or other suitable components can determine whether a scan response message has been received from an AVS and/or other anti-malware server 20 in the last T seconds, where T is a configurable acceptable time between two heartbeat messages. If such a message has been received, method 600 can proceed to 604, in which the AVS can be marked as active in the server status data structure 220 (e.g., by the communication component 510 and/or the server tracking component 210), and subsequently return to 602 for further monitoring.

If a scan response message has not been received from an AVS within the time window given at 602, a heartbeat request message can be sent to the AVS at 606, e.g., by an NAS node 10 according to an assignment generated by the node assignment component 110 as described above. In an aspect, the heartbeat request message 606 can be sent to a particular AVS only when that AVS has not already been marked as active at 604 based on communications received from that AVS at 602.

At 608, if a heartbeat response message, a scan response message, or another predetermined communication is received (e.g., by the NAS node 10 that sent the heartbeat request message at 606, the communication component 510, etc.) from the AVS to which the heartbeat request message was sent at 606, method 600 can proceed to 604 to mark the AVS as active in the server status data structure 220 as described above. In an aspect, an AVS can send any response back to the NAS node 10 from which the heartbeat request was sent in addition to, or in place of, an explicit heartbeat response message, since any response received from the AVS implies that the AVS is active.

Alternatively, if a predetermined communication is not received from the AVS at 608, e.g., a heartbeat response or scan response from the AVS times out, the AVS can be marked as inactive in the server status data structure 220 (e.g., by the communication component 510 and/or the server tracking component 210) at 610. Upon marking the AVS as either active or inactive in the server status data structure 220 at 604 or 610, respectively, method 600 can return to 602 for further monitoring.

Returning to FIG. 2, and with further reference to FIGS. 5-6, the server tracking component 210 can update the server status data structure 220 based on heartbeat messages, scan response messages, and/or other communications received from respective anti-malware servers 20, thereby resulting in reduced network overhead associated with an NAS system. For instance, the server tracking component 210 can indicate respective first anti-malware servers 20 from which scan response messages have been received (e.g., the anti-malware servers 20A-20C shown in FIG. 5) as well as a set of second anti-malware servers (e.g., the anti-malware servers 20D-20E shown in FIG. 5) for which responses to heartbeat request messages are received by their respectively assigned NAS nodes 10 as active anti-malware servers in the server status data structure 220. Similarly, the server tracking component 210 can indicate respective second anti-malware servers 20 from which responses to heartbeat request messages are not received by their respectively assigned NAS nodes as inactive anti-malware servers in the server status data structure 220. Other indication schemes could also be used.

Figure 7:
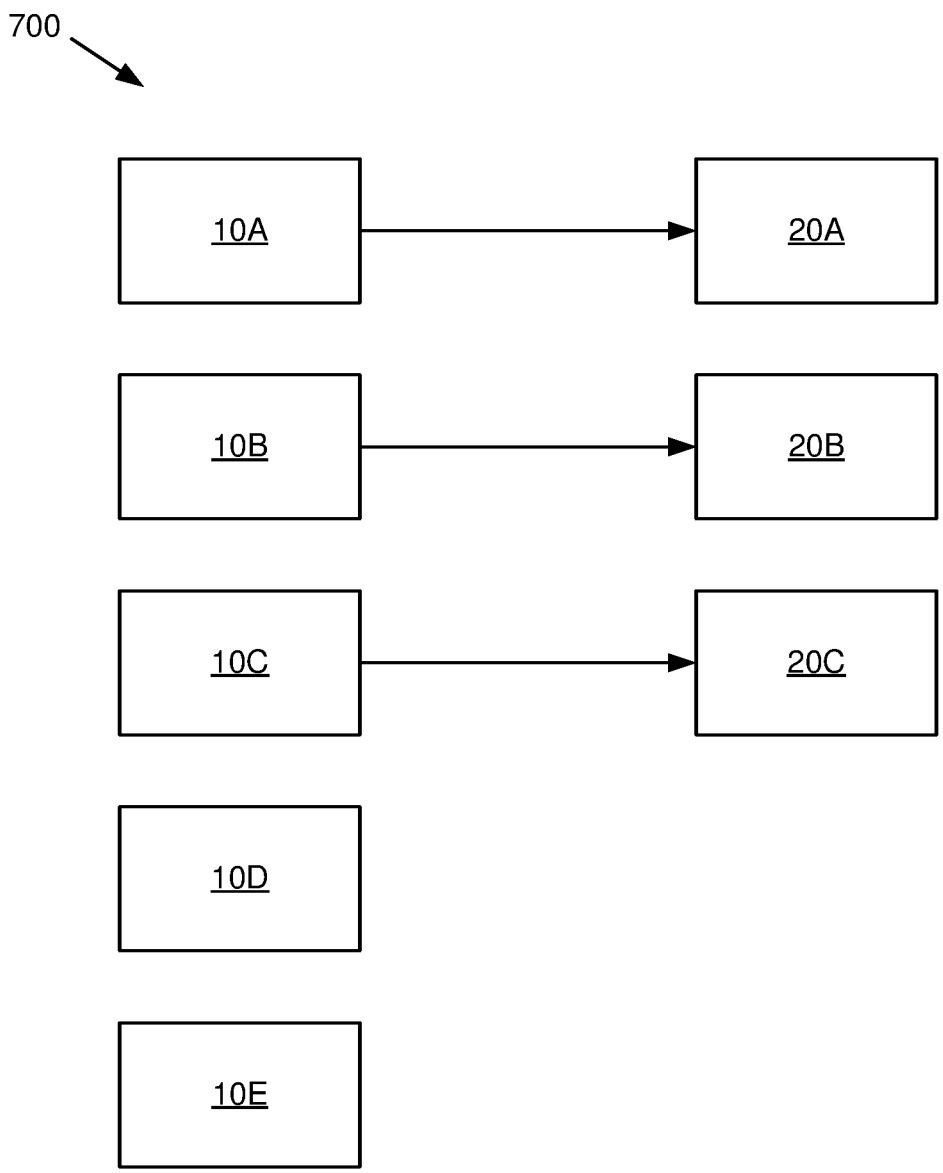
FIGS. 7-9 are diagrams depicting respective assignment schemes that can be utilized for directing heartbeat request messages from NAS nodes to remote servers in accordance with various aspects described herein.
Figure 8:
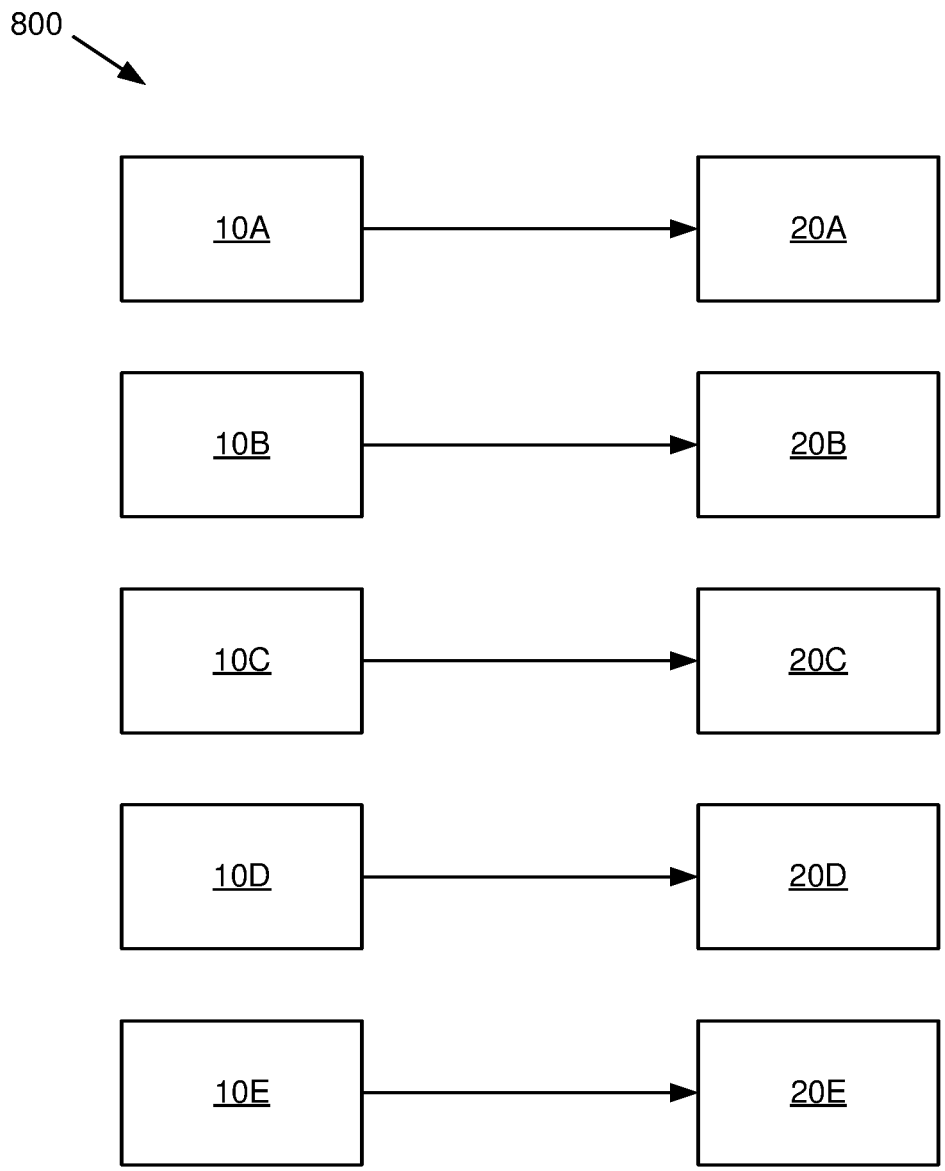
Figure 9:
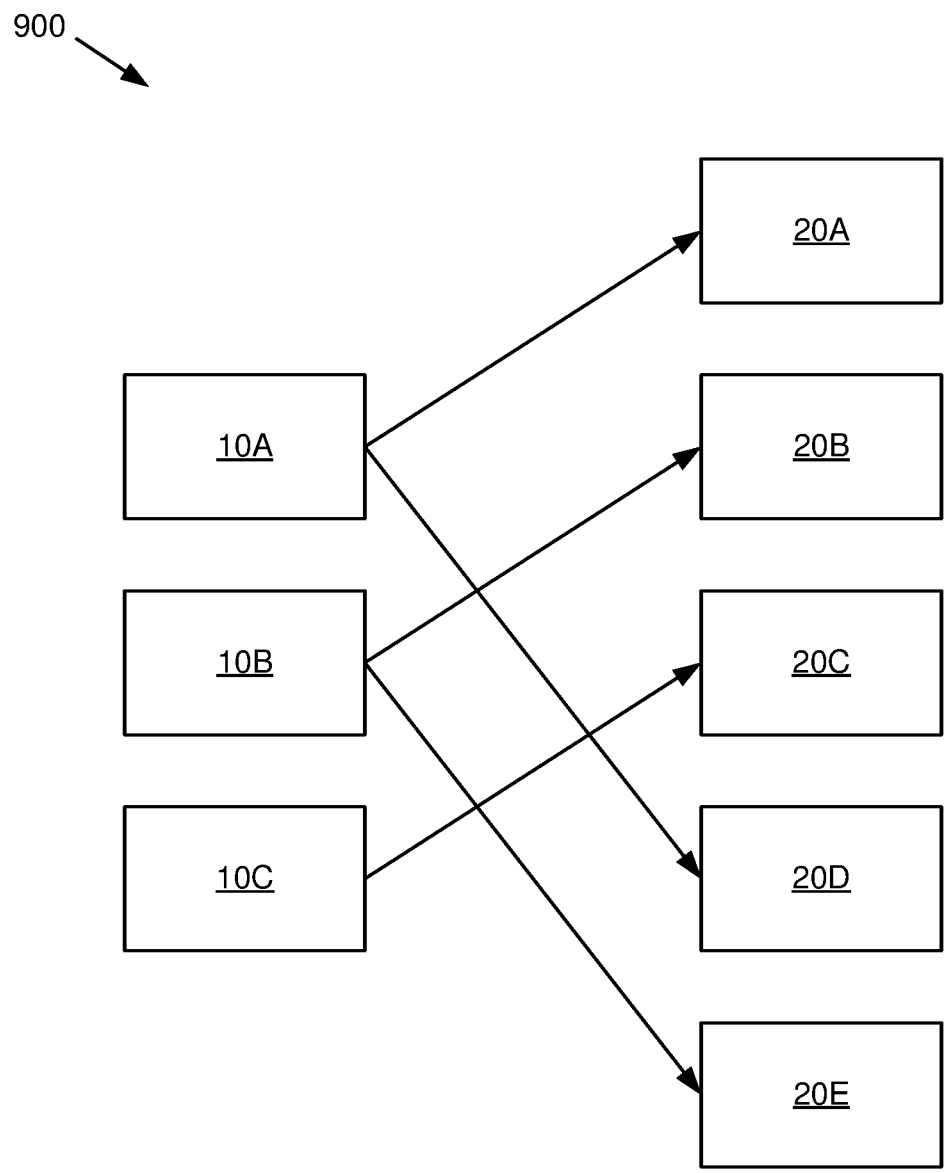

Referring now to FIGS. 7-9, diagrams depicting respective assignment schemes that can be utilized for directing heartbeat request messages from NAS nodes 10 to remote anti-malware servers 20 in accordance with various aspects described herein are illustrated. While FIGS. 7-9, as well as FIG. 5 above, depict systems including fixed numbers of NAS nodes 10 and/or anti-malware servers 20, it should be appreciated that the systems depicted by FIGS. 5 and 7-9 are intended merely as specific, non-limiting examples of systems that can be employed and have been simplified for brevity and simplicity of explanation. It should further be appreciated that the techniques described herein can be applied to any suitable NAS system that can be associated with any suitable number of NAS nodes 10 and/or anti-malware servers 20.

For purposes of the below description of FIGS. 7-9, the following definitions are used:

1.) M denotes the number of remote servers (e.g., anti-malware servers 20) configured for the system.

2.) N denotes the number of NAS nodes 10 in the system. These nodes are defined as having node IDs of [1, 2, ..., M−1, M, M+1, ..., N−1, N] for a system where N>M.

For a scenario in which M<N, NAS nodes 10 can be assigned to respective anti-malware servers 20 (e.g., by the node assignment component 110) as shown by diagram 700 in FIG. 7. Here, the first M NAS nodes 10 (e.g., according to their respective node IDs) can be assigned to engage in heartbeat messaging with the M remote servers in sequence. For instance, in the non-limiting example shown by diagram 700, nodes 10A-10C can submit a heartbeat request to servers 20A-20C, respectively. Any remaining NAS nodes 10, here nodes 10D and 10E, can be given no assignment at this stage.

In an aspect, if any of the first M NAS nodes 10 are inactive, another NAS node 10 (e.g., the next indexed node, or node ID K+1 for inactive node ID K) can submit heartbeat messaging on behalf of the inactive node. Substitution in this manner can also be performed for each inactive node that has been given an assignment by the node assignment component 110. If all of the NAS nodes 10 are selected to heartbeat with a unique remote server in this way and less than all anti-malware servers 20 have assigned NAS nodes 10, selection can wrap around and restart with node ID 1 per the above procedure.

For a scenario in which M=N, NAS nodes 10 can be assigned to respective anti-malware servers 20 (e.g., by the node assignment component 110) as shown by diagram 800 in FIG. 8. Here, the NAS nodes 10 can be assigned to respective anti-malware servers 20 using a similar one-to-one mapping as that described above with respect to FIG. 7, with the exception that any inactive NAS nodes 10 can cause the heartbeat messaging assignments to wrap back to node ID 1 as described above.

For a scenario in which M>N, NAS nodes 10 can be assigned to respective anti-malware servers 20 (e.g., by the node assignment component 110) as shown by diagram 900 in FIG. 9. Here, the N NAS nodes 10 can be assigned to engage in heartbeat messaging with the first N remote servers in sequence. For instance, in the non-limiting example shown by diagram 900, nodes 10A-10C can submit a heartbeat request to servers 20A-20C, respectively. The assignments can then wrap around such that the N NAS nodes 10 are given subsequent assignments to cover the remaining anti-malware servers 20, e.g., such that node ID 1 heartbeats with server ID N+1, node ID 2 heartbeats with server ID N+2, and so on. For instance, as shown by diagram 900, nodes 10A-10B can additionally submit a heartbeat request to servers 20D-20E, respectively. Assignments can wrap around in this manner until all servers 20 have an assigned NAS node, thereby establishing a one-to-many relationship from the NAS nodes 10 to the anti-malware servers 20.

Figure 10:
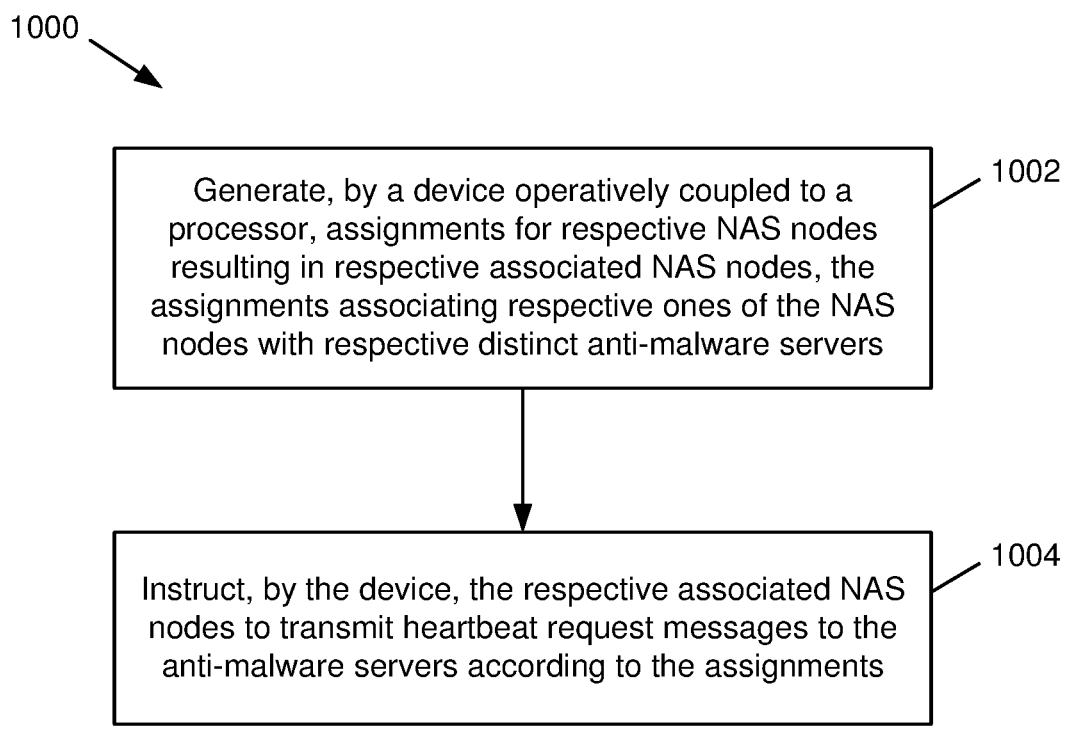
FIG. 10 is a flow diagram of a method that facilitates efficient heartbeat with remote servers by NAS cluster nodes in accordance with various aspects described herein.

With reference to FIG. 10, presented is a flow diagram of a method 1000 that facilitates efficient heartbeat with remote servers by NAS cluster nodes in accordance with various aspects described herein. At 1002, a device operatively coupled to a processor can generate (e.g., by a node assignment component 110) assignments for respective NAS nodes (e.g., NAS nodes 10) resulting in respective associated NAS nodes. The assignments generated at 1002 can associate respective ones of the NAS nodes with respective distinct anti-malware servers (e.g., anti-malware servers 20).

At 1004, the device can instruct (e.g., by a heartbeat messaging component 120) the respective associated NAS nodes to transmit heartbeat request messages to the anti-malware servers according to the assignments generated at 1002.

FIGS. 6 and 10 as described above illustrate respective methods in accordance with certain aspects of this disclosure. While, for purposes of simplicity of explanation, the methods have been shown and described as series of acts, it is to be understood and appreciated that this disclosure is not limited by the order of acts, as some acts may occur in different orders and/or concurrently with other acts from that shown and described herein. For example, those skilled in the art will understand and appreciate that methods can alternatively be represented as a series of interrelated states or events, such as in a state diagram. Moreover, not all illustrated acts may be required to implement methods in accordance with certain aspects of this disclosure.

Figure 11:
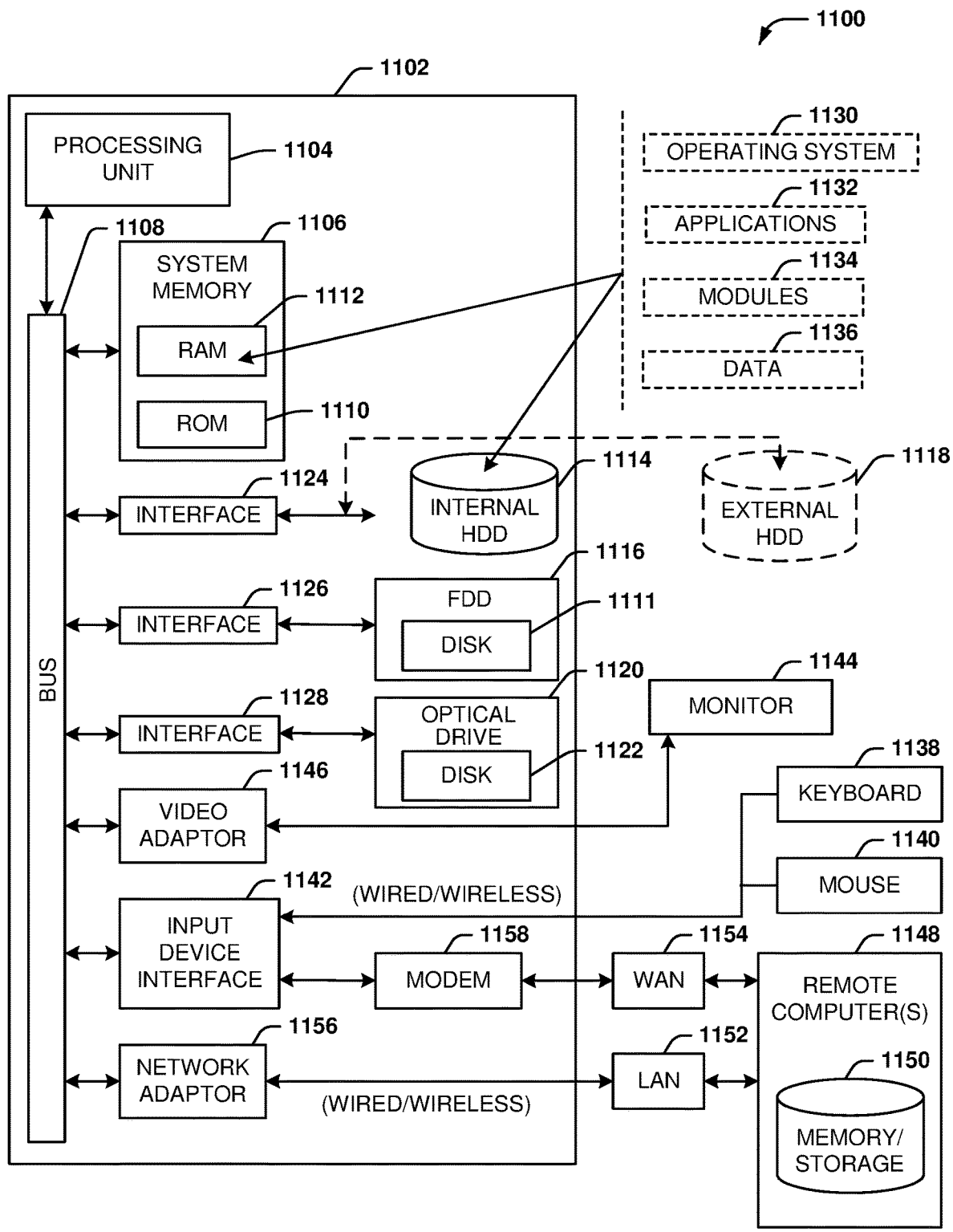
FIG. 11 is a diagram of an example computing environment in which various embodiments described herein can function.

In order to provide additional context for various embodiments described herein, FIG. 11 and the following discussion are intended to provide a brief, general description of a suitable computing environment 1100 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the inventive methods can be practiced with other computer system configurations, including single-processor or multiprocessor computer systems, minicomputers, mainframe computers, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media and/or communications media, which two terms are used herein differently from one another as follows. Computer-readable storage media can be any available storage media that can be accessed by the computer and includes both volatile and nonvolatile media, removable and non-removable media. By way of example, and not limitation, computer-readable storage media can be implemented in connection with any method or technology for storage of information such as computer-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, solid state drive (SSD) or other solid-state storage technology, compact disk read only memory (CD-ROM), digital versatile disk (DVD), Blu-ray disc or other optical disk storage, magnetic cassettes, magnetic tape, magnetic disk storage or other magnetic storage devices or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 11, the example environment 1100 for implementing various embodiments of the aspects described herein includes a computer 1102, the computer 1102 including a processing unit 1104, a system memory 1106 and a system bus 1108. The system bus 1108 couples system components including, but not limited to, the system memory 1106 to the processing unit 1104. The processing unit 1104 can be any of various commercially available processors. Dual microprocessors and other multi-processor architectures can also be employed as the processing unit 1104.

The system bus 1108 can be any of several types of bus structure that can further interconnect to a memory bus (with or without a memory controller), a peripheral bus, and a local bus using any of a variety of commercially available bus architectures. The system memory 1106 includes ROM 1110 and RAM 1112. A basic input/output system (BIOS) can be stored in a non-volatile memory such as ROM, erasable programmable read only memory (EPROM), EEPROM, which BIOS contains the basic routines that help to transfer information between elements within the computer 1102, such as during startup. The RAM 1112 can also include a high-speed RAM such as static RAM for caching data.

The computer 1102 further includes an internal hard disk drive (HDD) 1114 (e.g., EIDE, SATA), a magnetic floppy disk drive (FDD) 1116, (e.g., to read from or write to a removable diskette 1118) and an optical disk drive 1120, (e.g., reading a CD-ROM disk 1122 or, to read from or write to other high capacity optical media such as the DVD). While the internal HDD 1114 is illustrated as located within the computer 1102, the internal HDD 1114 can also be configured for external use in a suitable chassis (not shown). The HDD 1114, magnetic FDD 1116 and optical disk drive 1120 can be connected to the system bus 1108 by an HDD interface 1124, a magnetic disk drive interface 1126 and an optical drive interface 1128, respectively. The interface 1124 for external drive implementations includes at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1102, the drives and storage media accommodate the storage of any data in a suitable digital format. Although the description of computer-readable storage media above refers to an HDD, a removable magnetic diskette, and a removable optical media such as a CD or DVD, it should be appreciated by those skilled in the art that other types of storage media which are readable by a computer, such as zip drives, magnetic cassettes, flash memory cards, cartridges, and the like, can also be used in the example operating environment, and further, that any such storage media can contain computer-executable instructions for performing the methods described herein.

A number of program modules can be stored in the drives and RAM 1112, including an operating system 1130, one or more application programs 1132, other program modules 1134 and program data 1136. All or portions of the operating system, applications, modules, and/or data can also be cached in the RAM 1112. The systems and methods described herein can be implemented utilizing various commercially available operating systems or combinations of operating systems.

A user can enter commands and information into the computer 1102 through one or more wired/wireless input devices, e.g., a keyboard 1138 and a pointing device, such as a mouse 1140. Other input devices (not shown) can include a microphone, an infrared (IR) remote control, a joystick, a game pad, a stylus pen, touch screen or the like. These and other input devices are often connected to the processing unit 1104 through an input device interface 1142 that can be coupled to the system bus 1108, but can be connected by other interfaces, such as a parallel port, an IEEE 1394 serial port, a game port, a USB port, an IR interface, etc.

A monitor 1144 or other type of display device can be also connected to the system bus 1108 via an interface, such as a video adapter 1146. In addition to the monitor 1144, a computer typically includes other peripheral output devices (not shown), such as speakers, printers, etc.

The computer 1102 can operate in a networked environment using logical connections via wired and/or wireless communications to one or more remote computers, such as a remote computer(s) 1148. The remote computer(s) 1148 can be a workstation, a server computer, a router, a personal computer, portable computer, microprocessor-based entertainment appliance, a peer device or other common network node, and typically includes many or all of the elements described relative to the computer 1102, although, for purposes of brevity, only a memory/storage device 1150 is illustrated. The logical connections depicted include wired/wireless connectivity to a local area network (LAN) 1152 and/or larger networks, e.g., a wide area network (WAN) 1154. Such LAN and WAN networking environments are commonplace in offices and companies, and facilitate enterprise-wide computer networks, such as intranets, all of which can connect to a global communications network, e.g., the Internet.

When used in a LAN networking environment, the computer 1102 can be connected to the local network 1152 through a wired and/or wireless communication network interface or adapter 1156. The adapter 1156 can facilitate wired or wireless communication to the LAN 1152, which can also include a wireless access point (AP) disposed thereon for communicating with the wireless adapter 1156.

When used in a WAN networking environment, the computer 1102 can include a modem 1158 or can be connected to a communications server on the WAN 1154 or has other means for establishing communications over the WAN 1154, such as by way of the Internet. The modem 1158, which can be internal or external and a wired or wireless device, can be connected to the system bus 1108 via the input device interface 1142. In a networked environment, program modules depicted relative to the computer 1102 or portions thereof, can be stored in the remote memory/storage device 1150. It will be appreciated that the network connections shown are example and other means of establishing a communications link between the computers can be used.

The computer 1102 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, restroom), and telephone. This can include Wireless Fidelity (Wi-Fi) and BLUETOOTH® wireless technologies. Thus, the communication can be a predefined structure as with a conventional network or simply an ad hoc communication between at least two devices.

The above description includes non-limiting examples of the various embodiments. It is, of course, not possible to describe every conceivable combination of components or methodologies for purposes of describing the disclosed subject matter, and one skilled in the art may recognize that further combinations and permutations of the various embodiments are possible. The disclosed subject matter is intended to embrace all such alterations, modifications, and variations that fall within the spirit and scope of the appended claims.

With regard to the various functions performed by the above described components, devices, circuits, systems, etc., the terms (including a reference to a "means") used to describe such components are intended to also include, unless otherwise indicated, any structure(s) which performs the specified function of the described component (e.g., a functional equivalent), even if not structurally equivalent to the disclosed structure. In addition, while a particular feature of the disclosed subject matter may have been disclosed with respect to only one of several implementations, such feature may be combined with one or more other features of the other implementations as may be desired and advantageous for any given or particular application.

The terms "exemplary" and/or "demonstrative" as used herein are intended to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent structures and techniques known to one skilled in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

The term "or" as used herein is intended to mean an inclusive "or" rather than an exclusive "or." For example, the phrase "A or B" is intended to include instances of A, B, and both A and B. Additionally, the articles "a" and "an" as used in this application and the appended claims should generally be construed to mean "one or more" unless either otherwise specified or clear from the context to be directed to a singular form.

The term "set" as employed herein excludes the empty set, i.e., the set with no elements therein. Thus, a "set" in the subject disclosure includes one or more elements or entities. Likewise, the term "group" as utilized herein refers to a collection of one or more entities.

The terms "first," "second," "third," and so forth, as used in the claims, unless otherwise clear by context, is for clarity only and doesn't otherwise indicate or imply any order in time. For instance, "a first determination," "a second determination," and "a third determination," does not indicate or imply that the first determination is to be made before the second determination, or vice versa, etc.

The description of illustrated embodiments of the subject disclosure as provided herein, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as one skilled in the art can recognize. In this regard, while the subject matter has been described herein in connection with various embodiments and corresponding drawings, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

What is claimed is:

1. A data storage system, comprising:
a memory that stores computer executable components; and
a processor that executes computer executable components stored in the memory, wherein the computer executable components comprise:
a node assignment component that generates assignments for respective ones of a plurality of network-attached storage (NAS) nodes resulting in respective associated NAS nodes, the assignments associating the respective ones of the plurality of NAS nodes with respective anti-malware servers, wherein the assignments result in the respective anti-malware servers being associated with no more than one of the respective associated NAS nodes, and wherein the assignments further result in the respective associated NAS nodes being associated with pluralities of the respective anti-malware servers; and
a heartbeat messaging component that instructs the respective associated NAS nodes to determine an active status of the respective anti-malware servers by transmitting heartbeat request messages to the pluralities of the respective anti-malware servers associated with the respective associated NAS nodes according to the assignments.

2. The data storage system of claim 1, wherein the computer executable components further comprise:
a server tracking component that maintains a data structure comprising information relating to the respective anti-malware servers based on respective responses to the heartbeat request messages as received from the respective anti-malware servers.

3. The data storage system of claim 2, wherein the computer executable components further comprise:
a node interface component that propagates information associated with the data structure maintained by the server tracking component to the respective ones of the plurality of NAS nodes.

4. The data storage system of claim 1, wherein the computer executable components further comprise:
a communication component that receives file scan response messages from first anti-malware servers of the respective anti-malware servers; and
a classification component that identifies second anti-malware servers of the respective anti-malware servers from which respective file scan response messages have not been received by the communication component within a rolling time interval,
wherein the assignments generated by the node assignment component associate the respective associated NAS nodes with respective ones of the second anti-malware servers and do not associate the respective associated NAS nodes with respective ones of the first anti-malware servers.

5. The data storage system of claim 4, wherein the server tracking component indicates the first anti-malware servers and a set of the second anti-malware servers for which responses to the heartbeat request messages are received by the respective associated NAS nodes as active anti-malware servers.

6. The data storage system of claim 4, wherein the server tracking component indicates a set of the second anti-malware servers for which responses to the heartbeat request messages are not received by the respective associated NAS nodes as inactive anti-malware servers.

7. The data storage system of claim 1, wherein the NAS nodes of the plurality of NAS nodes are distinct from the respective anti-malware servers.

8. The data storage system of claim 1, wherein the respective associated NAS nodes are associated with respective node identifiers, wherein the respective anti-malware servers are associated with respective server identifiers, and wherein the node assignment component generates the assignments in sequence according to the node identifiers and the server identifiers such that the assignments wrap around to a first NAS node of the respective NAS nodes having a first identifier until each of the respective anti-malware servers have been associated with a NAS node of the respective NAS nodes.

9. A method, comprising:
generating, by a device operatively coupled to a processor, assignments for respective ones of a plurality of network-attached storage (NAS) nodes resulting in respective associated NAS nodes, the assignments associating respective ones of the plurality of NAS nodes with respective anti-malware servers such that the respective anti-malware servers are respectively associated via the assignments with no more than one of the respective associated NAS nodes and further such that the respective associated NAS nodes are respectively associated via the assignments with pluralities of the respective anti-malware servers; and
instructing, by the device, the respective associated NAS nodes to determine an active status of the respective anti-malware servers by transmitting heartbeat request messages to the pluralities of the respective anti-malware servers associated with the respective associated NAS nodes according to the assignments.

10. The method of claim 9, further comprising:
maintaining, by the device, a data structure comprising information relating to the respective anti-malware servers based on respective responses to the heartbeat request messages as received from the respective anti-malware servers.

11. The method of claim 10, further comprising:
propagating, by the device, respective information associated with the data structure to the respective ones of the plurality of NAS nodes.

12. The method of claim 9, further comprising:
receiving, by the device, first file scan response messages from first anti-malware servers of the respective anti-malware servers; and
identifying, by the device, second anti-malware servers of the respective anti-malware servers from which second file scan response messages have not been received within a time interval,
wherein the generating the assignments comprises associating, by the device, the respective associated NAS nodes with respective second ones of the second anti-malware servers without associating the respective associated NAS nodes with respective first ones of the first anti-malware servers.

13. The method of claim 12, further comprising:
indicating, by the device, ones of the respective first ones of the first anti-malware servers and the respective second ones of the second anti-malware servers for which responses to the heartbeat request messages are received by the respective associated NAS nodes as active anti-malware servers.

14. The method of claim 12, further comprising:
indicating, by the device, ones of the respective second ones of the second anti-malware servers for which responses to the heartbeat request messages have not been received by the respective associated NAS nodes as inactive anti-malware servers.

15. The method of claim 9, wherein the NAS nodes of the plurality of NAS nodes are distinct from the respective anti-malware servers.

16. A non-transitory machine-readable medium comprising computer executable instructions that, when executed by a processor, facilitate performance of operations, the operations comprising:
generating respective assignments for a group of network-attached storage (NAS) nodes resulting in respective associated NAS nodes, wherein the respective assignments associate each NAS node of the respective associated NAS nodes with an anti-malware server of a group of anti-malware servers, wherein the generating results in the anti-malware servers of the group of anti-malware servers being respectively associated via the respective assignments with no more than one of the respective associated NAS nodes, and wherein the generating further results in the respective associated NAS nodes being associated with respective pluralities of anti-malware servers of the group of anti-malware servers; and
instructing each NAS node of the respective associated NAS nodes to determine a status of the respective anti-malware servers of the group of anti-malware servers by transmitting a respective heartbeat request message to the respective pluralities of the anti-malware servers of the group of anti-malware servers associated with the respective associated NAS nodes according to the respective assignments.

17. The non-transitory machine-readable medium of claim 16, wherein the operations further comprise:
maintaining a data structure comprising information relating to the group of anti-malware servers based on respective responses received from the group of anti-malware servers responsive to the respective heartbeat request message transmitted by each NAS node of the respective associated NAS nodes.

18. The non-transitory machine-readable medium of claim 17, wherein the operations further comprise:
propagating respective information associated with the data structure to the respective associated NAS nodes.

19. The non-transitory machine-readable medium of claim 16, wherein the operations further comprise:
receiving first file scan response messages respectively from first anti-malware servers of the group of anti-malware servers; and
identifying second anti-malware servers of the group of anti-malware servers from which second file scan response messages have not been received within a rolling time interval,
wherein the respective assignments for the respective associated NAS nodes associate the respective associated NAS nodes with respective ones of the second anti-malware servers without associating the respective associated NAS nodes with respective ones of the first anti-malware servers.

20. The non-transitory machine readable medium of claim 16, wherein the respective NAS nodes of the group of NAS nodes are distinct from the respective anti-malware servers of the group of anti-malware servers.

* * * * *